United States Patent
Huang

(10) Patent No.: US 10,531,755 B1
(45) Date of Patent: Jan. 14, 2020

(54) DRINK HOLDER MOUNTING STRUCTURE FOR ATTACHING TO VARIOUS TUBULAR OBJECTS

(71) Applicant: Pei-Hsiu Huang, New Taipei (TW)

(72) Inventor: Pei-Hsiu Huang, New Taipei (TW)

( * ) Notice: Subject to any disclaimer, the term of this patent is extended or adjusted under 35 U.S.C. 154(b) by 0 days.

(21) Appl. No.: 16/234,527

(22) Filed: Dec. 27, 2018

(51) Int. Cl.
  *A47G 23/02* (2006.01)
  *F16B 2/00* (2006.01)
  *F16B 2/10* (2006.01)

(52) U.S. Cl.
  CPC .......... *A47G 23/0225* (2013.01); *F16B 2/005* (2013.01); *F16B 2/10* (2013.01)

(58) Field of Classification Search
  USPC ...................................................... 248/230.4
  See application file for complete search history.

(56) References Cited

U.S. PATENT DOCUMENTS

| | | | | |
|---|---|---|---|---|
| 4,828,211 A * | 5/1989 | McConnell | ............ | B60N 3/102 211/75 |
| 4,887,784 A * | 12/1989 | Kayali | .................. | B60N 3/102 248/311.2 |
| 4,984,722 A * | 1/1991 | Moore | .................. | B60N 3/102 224/549 |
| 5,014,956 A * | 5/1991 | Kayali | .................. | B60N 3/102 248/311.2 |
| 5,280,870 A * | 1/1994 | Chick | .................... | B60N 3/102 211/88.01 |
| 5,505,417 A * | 4/1996 | Plocher | .................. | B60N 3/102 248/311.2 |
| 5,522,527 A * | 6/1996 | Tsai | ........................ | B62J 11/00 224/414 |
| 5,603,477 A * | 2/1997 | Deutsch | ................. | B60N 3/102 248/292.12 |
| 5,996,957 A * | 12/1999 | Kurtz | ................. | A47G 23/0225 248/231.21 |
| 6,047,937 A * | 4/2000 | Huang | ................... | B60N 3/102 248/311.2 |
| 6,095,471 A * | 8/2000 | Huang | ................... | B60N 3/102 224/400 |
| 6,527,240 B1* | 3/2003 | Huang | ............... | A47G 23/0225 248/218.4 |
| 7,284,737 B2* | 10/2007 | Kane | .................. | A47G 23/0225 248/226.11 |
| 7,300,031 B2* | 11/2007 | Bertsch | .............. | A47G 23/0225 224/281 |

(Continued)

*Primary Examiner* — Monica E Millner
(74) *Attorney, Agent, or Firm* — Leong C. Lei

(57) ABSTRACT

A clamp body includes a first clamping member and a clamping seat that are integrally formed together, a pivot hole formed in the clamping seat, and a second clamping member pivotally connected to the pivot hole. Also included are an elongated through hole formed in the first clamping member, a circular arc wall extending from the elongated through hole and gradually shallowing from a depth, a position-limiting axle between inside wall surfaces of the second clamping member, a tightness adjusting assembly including a rounded-head pushing rod, and a rotation assembly for coupling the clamp body and the holder. As such, the clamp body that has one arm to fix and one arm to move could improve stability of clamping. The arrangement of the elongated through hole and the circular arc wall gradually shallowing from a depth is used to reduce a size of the tightness adjusting assembly projecting to outside.

6 Claims, 15 Drawing Sheets

(56) References Cited

U.S. PATENT DOCUMENTS

| | | | | |
|---|---|---|---|---|
| 7,959,121 B1* | 6/2011 | Barnes, Jr. | ......... | A47G 23/0225 |
| | | | | 224/148.4 |
| 8,500,076 B2* | 8/2013 | Lai | ..................... | A47G 23/0225 |
| | | | | 224/148.5 |
| 9,241,554 B1* | 1/2016 | Tong | ...................... | A45C 13/00 |
| 9,295,320 B1* | 3/2016 | McManus | ............... | A45F 5/021 |
| 9,944,209 B1* | 4/2018 | Carnevali | ............ | F16M 13/022 |
| 9,945,514 B1* | 4/2018 | Huang | ................. | F16M 13/022 |
| 10,082,242 B1* | 9/2018 | Huang | ................. | F16M 13/022 |
| 2002/0070324 A1* | 6/2002 | Huang | ................. | A47G 23/0225 |
| | | | | 248/311.2 |
| 2008/0128571 A1* | 6/2008 | Dostaler | ............ | A47G 23/0225 |
| | | | | 248/229.13 |
| 2014/0252820 A1* | 9/2014 | Botello | ................. | F16M 13/02 |
| | | | | 297/188.04 |
| 2014/0284443 A1* | 9/2014 | Forbes | ................... | G09F 21/04 |
| | | | | 248/313 |
| 2017/0325559 A1* | 11/2017 | Johnson | ............. | A47G 23/0225 |
| 2018/0001950 A1* | 1/2018 | Allen | ...................... | B62J 9/003 |

\* cited by examiner

DRINK HOLDER MOUNTING STRUCTURE FOR ATTACHING TO VARIOUS TUBULAR OBJECTS

(a) TECHNICAL FIELD OF THE INVENTION

The present invention provides a drink holder mounting structure for attaching to various tubular objects, and more particularly to a drink holder mounting structure for attaching to various tubular objects that combines a clamp body featuring single arm rotation with a rotation assembly and a rotatable holder to securely clamp onto various types of tubular object and that uses multiple unique arrangements to improve structural aesthetics and operation safety.

(b) DESCRIPTION OF THE PRIOR ART

Various appliances or devices that are commonly used in daily living are structured by using tubes or strips as support or connection between parts and mechanism. Examples include wheelchairs, rollators, bicycles, beach chairs, and baby trolleys. It is inconvenient to place a cup on such appliances or device. To cope with such a problem, a tube clamp is provided for clamping and thus attaching to one of the tubes or strips and a holder is provided on the tube clamp in order to provide desired convenience.

Among known tube clamps, a kind of tube clamps that is structured to use tight fastening for attaching shows better structure strength than those achieving attaching by means of elastic clamping and is better to serve as a holding frame. However, in compressing a tube, in addition to compressing to a fixed object, it is also subjected to a reacting force from the tube so that a bent portion of the tube clamp is susceptible to cracking and deformation, which may lead to detaching in mild damage situations and would become inoperable in severe damage situations. For tube clamps made through varying thickness or integral formation, due to desired operation of such tube clamps, additional burdens of increased difficulty of manufacturing may be caused, not to mention additional consideration must be taken for combination with a cup holder.

Further, two clamping arms of the tube clamp are provided on the same axis or both arms are made rotatable. The arrangement that the two arms are provided on the same axis might affect the position on which the cup holder is arranged, or leads to undesired expansion of overall size and bad looking of the structure. For the arrangement that the two arms are made rotatable, even though the arms can securely clamp and attach to a tube, they work only for circular tubes and the pivoting of the two arms allows for free rotation so that the cup holder may swing back and forth, and may even cause undesired pouring of beverage. Generally speaking, it does not provide a secured effect of clamping.

Further, for a greater range of swing for the tube clamp, the bolts for fastening and operatively coupling the clamping arms must be of a longer configuration. Consequently, when a locking element for fastening is tighten further, the bolt would project out more, leading to risk of damage in use.

SUMMARY OF THE INVENTION

The primary objective of the present invention is that a first clamping member and a clamping seat are integrally formed together, with a second clamping member that is controlled by a tightness adjusting assembly pivoted thereto, and a rotation assembly couples a holder to the clamping seat to expand the types of tubular objects to which application of clamping can be made and to improve stability of clamping. Further, an elongated through hole and circular arc wall that are constructed as a recess structure that gradually shallows from a depth, in combination with an arrangement of a rounded-head pushing rod and a head-concealing hole to make a fastening operation of the tightness adjusting assembly can be conducted with a reduced length requirement of the screwing member and to completely conceal a screwing member inside the head-concealing hole, thereby increasing operation safety and reducing material cost.

To achieve the above objective, the present invention provides a main structure that comprises: a clamp body, wherein the clamp body comprises a first clamping member, a clamping seat integrally formed with the first clamping member, at least one pivot hole formed in one side of the clamping seat that is away from the first clamping member, a second clamping member pivotally connected to the pivot hole, and a plurality of hooking arc sections respectively formed at ends of the first clamping member and the second clamping member. The clamping seat is formed with a first pin hole section. The second clamping member is formed with a circular arc section at one side of the pivot hole. The circular arc section defines a swing gap with respect to the clamping seat. The first clamping member is formed with an elongated through hole and defines at least one circular arc wall extending from an outer edge of the elongated through hole and formed as gradually shallowing from a depth. A position-limiting axle is arranged between inside wall surfaces of the second clamping member. A tightness adjusting assembly is arranged at one side of the first clamping member for adjusting tightness between the first clamping member and the second clamping member. The tightness adjusting assembly comprises a screwing member received through the elongated through hole, a flattened section formed on the screwing member, a through-hole section formed in the flattened section for receiving extension of the position-limiting axle therethrough, and a fastening member screwed to the screwing member for fastening and tightening the first clamping member. The fastening member comprises a gripping section, a rounded-head pushing rod formed at one side of the gripping section, and a head-concealing hole in communication with the gripping section and the rounded-head pushing rod for receiving the screwing member to embed therein. The clamp body is coupled to a holder by a rotation assembly. The rotation assembly comprises a rotation seat corresponding to and coupled to the clamping seat, an engagement trough formed in the rotation seat, at least one first joint section defined on an upper edge of the engagement trough, an engagement member movably arranged in the engagement trough, an engagement seat integrally formed with the holder and driven through operative coupling of the engagement member and the rotation seat to rotate, and a riveting member for riveting the clamping seat, the rotation seat and the engagement seat, wherein the engagement trough is formed therein with a position-limiting pillar in communication with the first pin hole section. The position-limiting pillar has a side wall formed with at least one position-limiting projection section. The engagement member is formed thereon with a position-limiting recess section corresponding to and coupled to the position-limiting pillar and the position-limiting projection section. The engagement seat is formed with at least one position-limiting hole. The engagement seat is formed, in a center thereof with a second pin hole section in communication with a center of the position-limiting pillar and the first pin hole section. At least one second joint section is defined in a lower edge of the engagement seat defines to correspond to and couple with the first joint section. A position-limiting mechanism is arranged at one side of the engagement seat for selectively changing the direction of the holder through the rotation assembly. The position-limiting mechanism comprises a pressing member selectively projecting beyond the holder to selectively push the engagement member, and an elastic member sleeved over the position-limiting pillar for reciprocal movement of the engagement member. The pressing member comprises at least one engaging and fixing section extending through the position-limiting hole and a barbed section formed on the engaging and fixing section to engage and abut the engagement seat.

When a user uses the present invention to clamp on a tubular object, the first clamping member is positioned against the tubular object and the gripping section of the tightness adjusting assembly is operated to have the rounded-head pushing rod pull, through the screwing member, back the second clamping member. Under such a condition, the through-hole section of the flattened section allows the screwing member to swing or oscillate on the position-limiting axle thereby making the screwing member to swing in the elongated through hole and drive the rounded-head pushing rod to slide along the circular arc wall that gradually shallows from a depth. As such, the second clamping member is cause to swing or oscillate about an axis defined by the pivot hole and works with the first clamping member to clamp onto the tubular object. The clamping operation is carried out such that the first clamping member and the clamping seat are both fixed and immobile and only the second clamping member is involved in a single-arm swing operation, wherein the second clamping member uses the circular arc section and the swing gap to greatly increase an oscillation or swing angle thereof, thereby increasing the types of tubular objects to which application can be made, and to effectively improve overall stability of clamping through multiple point fixing achieved with the hooking arc section. Further, since the holder is coupled by means of the rotation assembly, in addition to rotation that provides flexibility of angle adjustment, the position-limiting mechanism can be used to ease manipulation of the angle of the holder for fixing at a desired angle to make the use thereof by a user convenient.

With the above-described techniques, the problems of the prior art concerning constraints to the position where a holder may be placed, excessively large size, structure being bad looking, poor stability of clamping, and poor operation safety can be overcome to provide practical advantages.

The foregoing objectives and summary provide only a brief introduction to the present invention. To fully appreciate these and other objects of the present invention as well as the invention itself all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
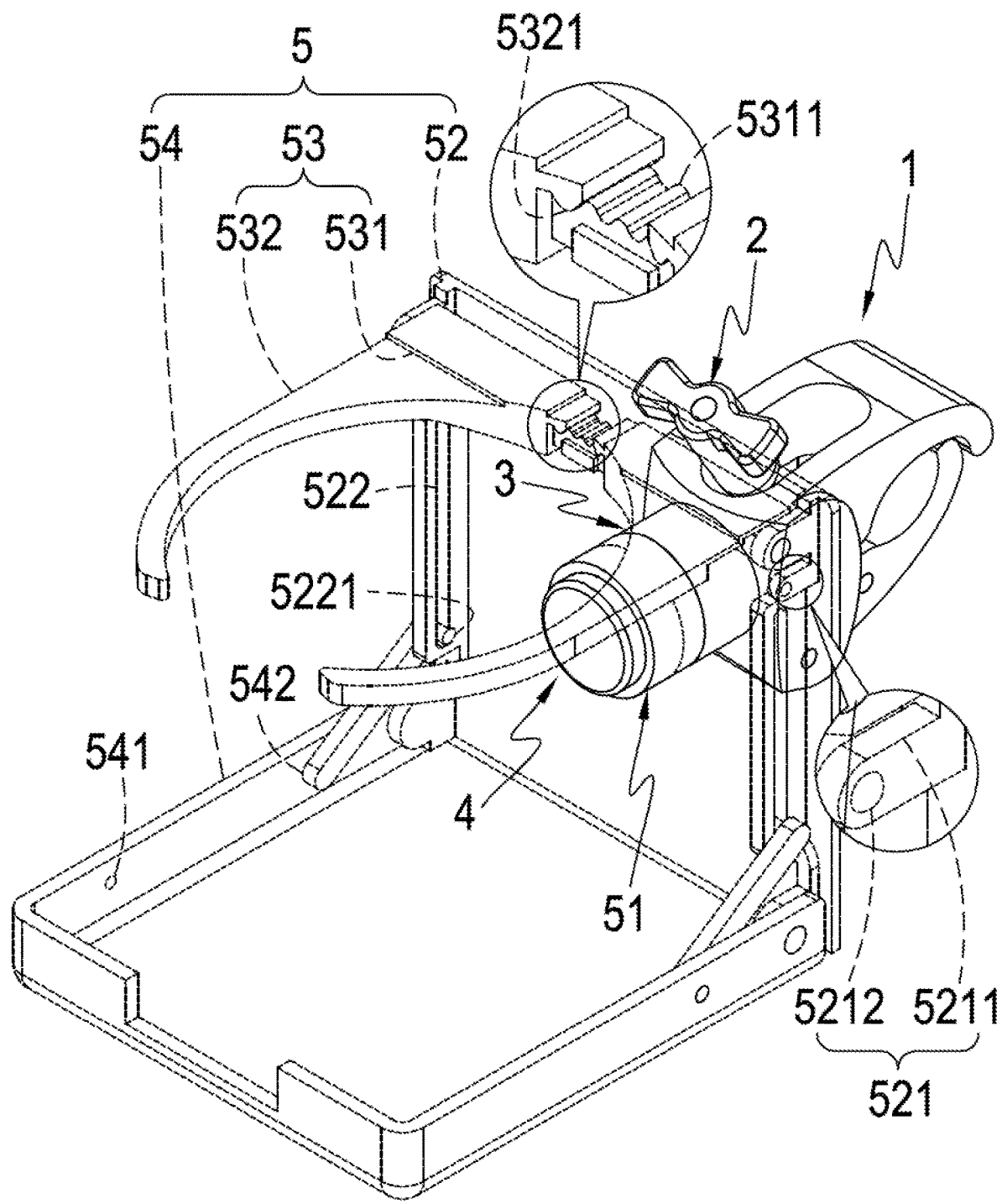
FIG. 1 is a perspective view showing a preferred embodiment of the present invention.
Figure 2:
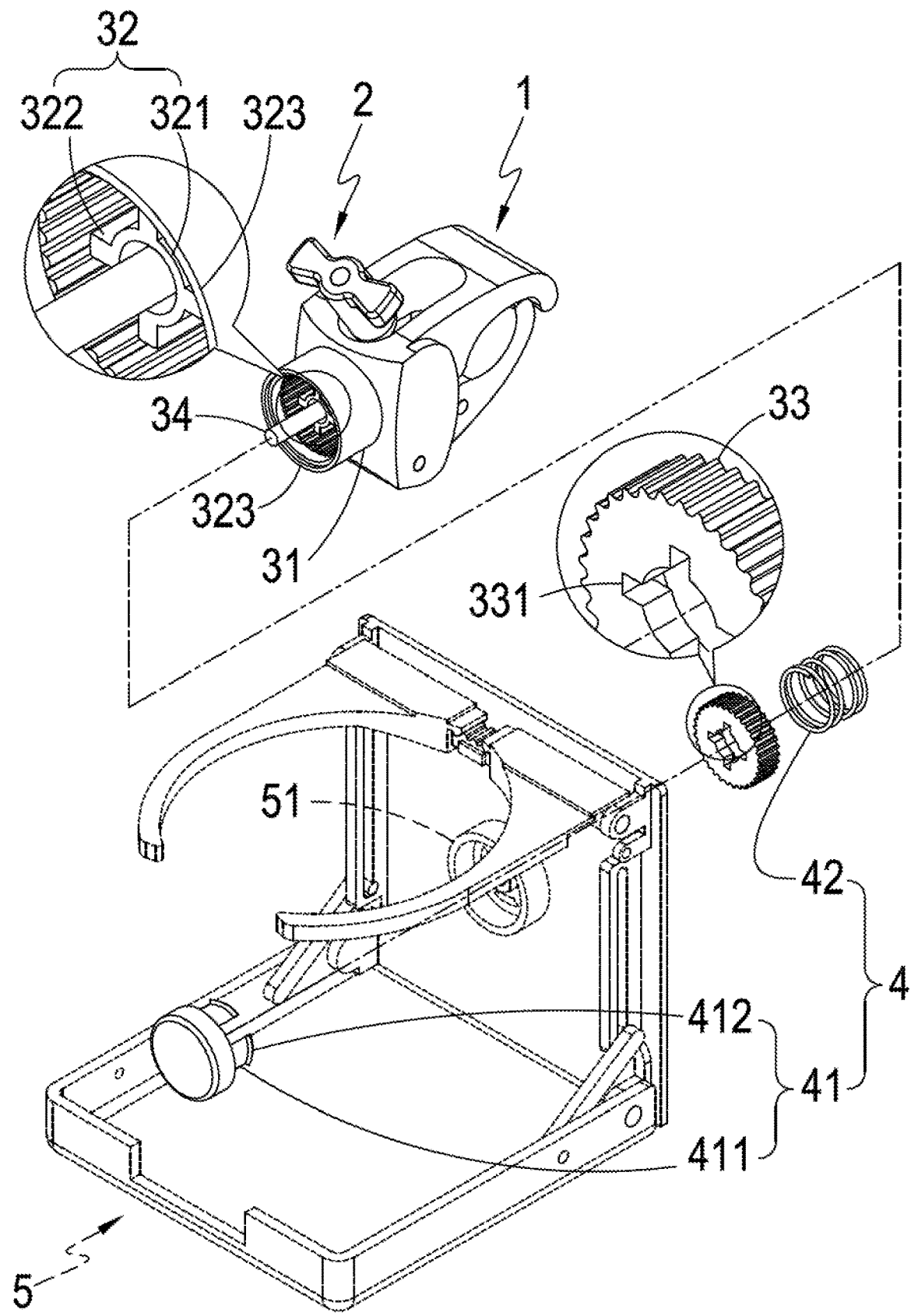
FIG. 2 is an exploded view showing the preferred embodiment of the present invention.
Figure 3:
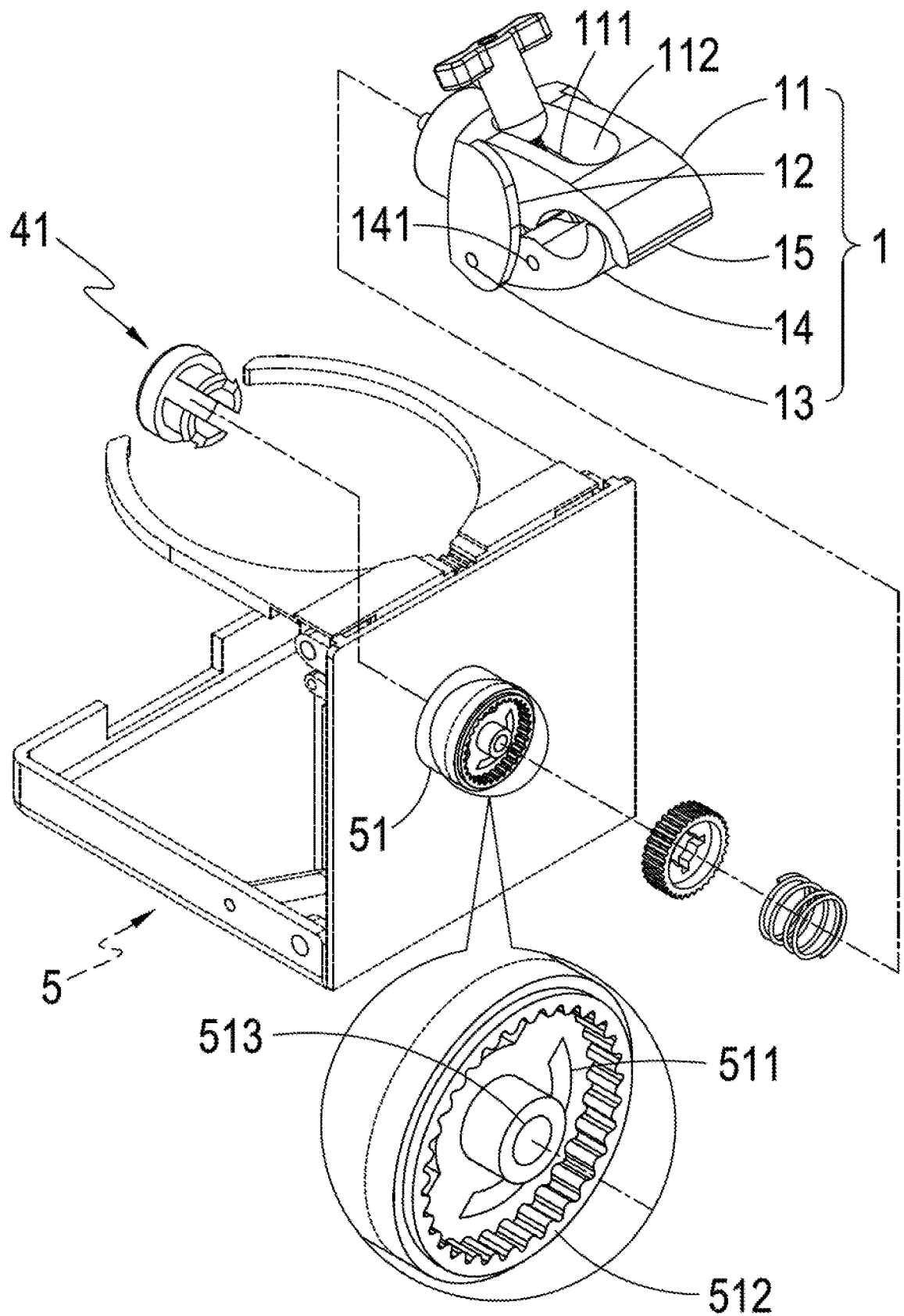
FIG. 3 is another exploded view showing the preferred embodiment of the present invention.
Figure 4:
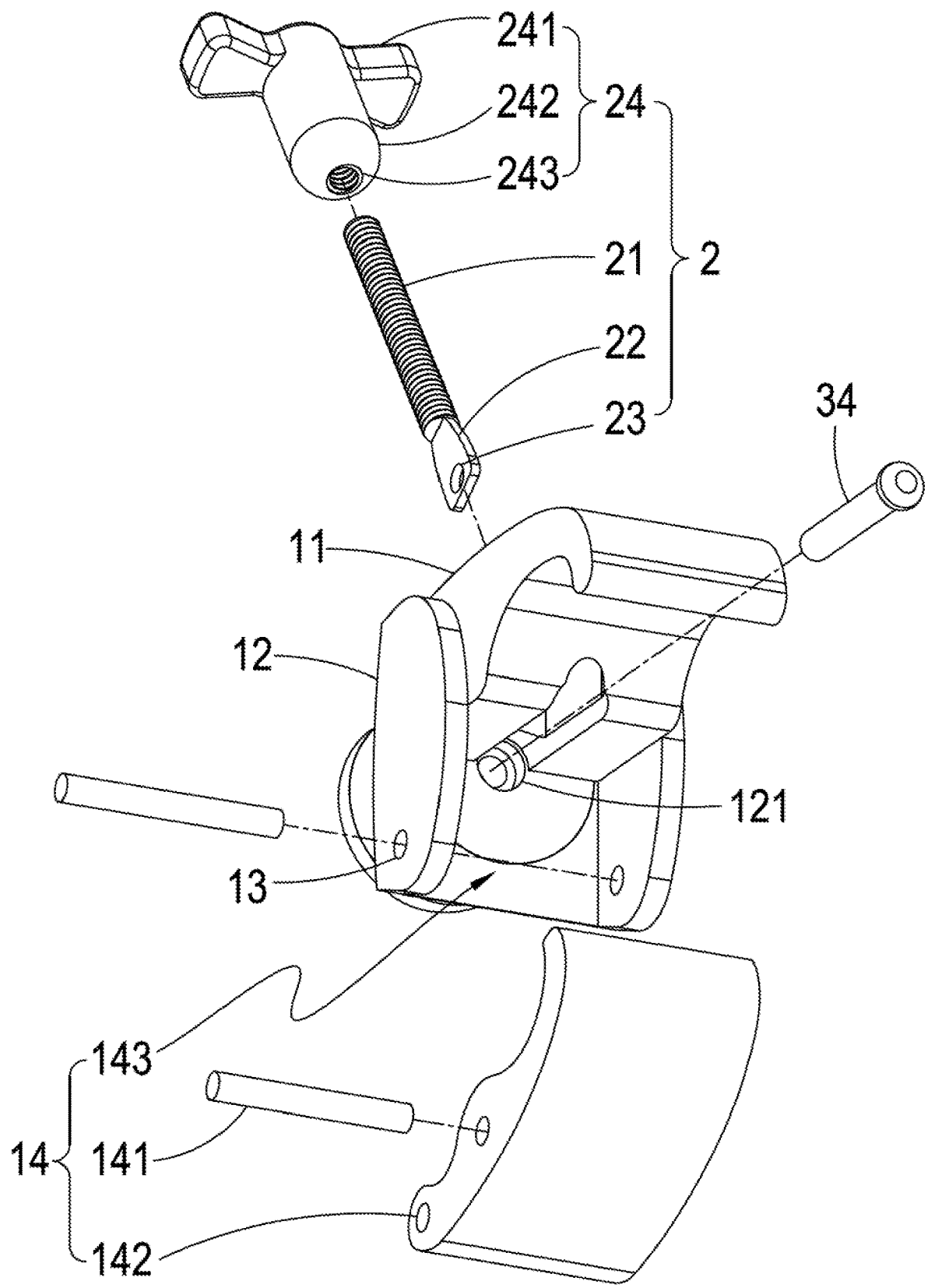
FIG. 4 is an exploded view showing a clamp body of the present invention.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

As shown in FIGS. 1-4, the present invention comprises:
a clamp body 1, wherein the clamp body 1 comprises a first clamping member 11, a clamping seat 12 integrally formed with the first clamping member 11, at least one pivot hole 13 formed in one side of the clamping seat 12 that is away from the first clamping member 11, a second clamping member 14 pivotally connected to the pivot hole 13, and a plurality of hooking arc sections 15 respectively formed at ends of the first clamping member 11 and the second clamping member 14;

a first pin hole section 121 formed in the clamping seat 12 and in communication with a center of the position-limiting pillar 321 that will be described later;

a circular arc section 142 formed on the second clamping member 14 and located at one side of the pivot hole 13, the circular arc section 142 defining a swing gap 143 with respect to the clamping seat 12;

an elongated through hole 111 formed in the first clamping member 11;

at least one circular arc wall 112 defined on the first clamping member 11 and formed as being extended from an outer edge of the elongated through hole 111 in a manner of gradually shallowing from a depth;

a position-limiting axle 141 arranged between inside wall surfaces of the second clamping member 14;

a tightness adjusting assembly 2 movably arranged at one side of the first clamping member 11 for adjusting tightness between the first clamping member 11 and the second clamping member 14, the tightness adjusting assembly 2 comprising a screwing member 21 received through the elongated through hole 111, a flattened section 22 formed on the screwing member 21, a through-hole section 23 formed in the flattened section 22 for receiving extension of the position-limiting axle 141 therethrough, and a fastening member 24 screwed to the screwing member 21 for fastening and tightening the first clamping member 11, the fastening member 24 comprising a gripping section 241, a rounded-head pushing rod 242 formed at one side of the gripping section 241, and a head-concealing hole 243 in communication with the gripping section 241 and the rounded-head pushing rod 242 for receiving the screwing member 21 to embed therein;

a rotation assembly 3 for coupling the clamp body 1 and a holder 5, the rotation assembly 3 comprising a rotation seat 31 corresponding to and coupled to the clamping seat 12, an engagement trough 32 formed in the rotation seat 31, at least one first joint section 323 defined on an upper edge of the engagement trough 32, an engagement member 33 movably arranged in the engagement trough 32, and a riveting member 34 for riveting the clamping seat 12, the rotation seat 31 and the engagement seat 51 that will be described later;

an engagement seat 51 integrally formed with the holder 5 and driven through operative coupling of the engagement member 33 and the rotation seat 31 to rotate;

at least one second joint section 512 defied in a lower edge of the engagement seat 51 and corresponding to and coupled to the first joint section 323;

a position-limiting mechanism 4 arranged at one side of the engagement seat 51 for selectively changing the direction of the holder 5 through the rotation assembly 3, the position-limiting mechanism 4 comprising a pressing member 41 selectively projecting beyond the holder 5 to selectively push the engagement member 33, and an elastic member 42 sleeved over a position-limiting pillar 321 that will be described later for reciprocal movement of the engagement member 33;

wherein the engagement seat 51 is formed with at least one position-limiting hole 511, and the pressing member 41 comprises at least one engaging and fixing section 411 extending through the position-limiting hole 511 and a barbed section 412 formed on the engaging and fixing section 411 to engage and abut the engagement seat 51, the engagement trough 32 being formed therein with a position-limiting pillar 321 that receives the elastic member 42 to sleeve thereon, the position-limiting pillar 321 having a side wall formed with at least one position-limiting projection section 322, the engagement member 33 being formed thereon with a position-limiting recess section 331 corresponding to and coupled to the position-limiting pillar 321 and the position-limiting projection section 322, the engagement seat 51 being formed, in a center thereof, with a second pin hole section 513 in communication with a center of the position-limiting pillar 321 and the first pin hole section 121, so that the riveting member 34 is extendible through the first pin hole section 121 and the second pin hole section 513 to rivet the clamping seat 12, the rotation seat 31, and the holder 5 (wherein when the clamping seat 12 and the rotation seat 31 are integrally formed together, the first pin hole section 121 extends through centers of the clamping seat 12 and the rotation seat 31, and when the clamping seat 12 and the rotation seat 31 are combined with other means, such as riveting, the first pin hole section 121 of the clamping seat 12 is in communication with a center of the position-limiting pillar 321, wherein in the instant embodiment, the clamping seat 12 and the rotation seat 31 being integrally formed together is provided as an illustrative example);

wherein the holder 5 comprises a fixing plate 52 integrally formed with the engagement seat 51, a clamping arm assembly 53 pivoted to an upper part of the fixing plate 52, a bottom board section 54 pivoted to a lower part of the fixing plate 52, and at least one bottom board buckling section 541 formed in the bottom board section 54, the clamping arm assembly 53 comprising a bar section 531 fixed to the upper part of the fixing plate 52, a plurality of clamping arm sections 532 slidably coupled to the bar section 531, a plurality of positioning recess sections 5311 formed on the bar section 531, and a positioning projection section 5321 formed on each of the clamping arm sections 532 and corresponding to and limiting position of the positioning recess section 5311, the fixing plate 52 being formed thereon with at least one sliding channel 522 and at least one buckling member 521, the buckling member 521 comprising a board body 5211 connected to the fixing plate 52 and a fixing buckling section 5212 formed on the board body 5211 and corresponding to and coupled to the bottom board buckling section 541, the bottom board section 54 comprising at least one linking bar 542 that is slidable in the sliding channel 522 to pivotally connect thereto, the sliding channel 522 being formed with a position-limiting slot 5221 for positional constraint of the linking bar 542.

As shown in FIGS. 1-12, the clamp body 1 according to the present invention is generally made up of the clamping seat 12, the first clamping member 11, and the second clamping member 14. The clamping seat 12 is integrally formed with the first clamping member 11 and is corresponding to and coupled to the rotation seat 31 of the rotation assembly 3. The first clamping member 11 is formed with a recess structure that is made up of the elongated through hole 111 and the circular arc wall 112. The circular arc wall 112 is formed as extending from an outer edge of the elongated through hole 111 and is arranged to provide wall surfaces that show inclinations of different angles at two ends of the elongated through hole 111. Such an arrangement is a trough structure that gradually shallows from a depth for the tightness adjusting assembly 2 to guide a swing angle of the tightness adjusting assembly 2 and shorten a length of the tightness adjusting assembly 2 (wherein the length will be further described in the following paragraph), and also to provide an effect of fixing with at least two points when the rounded-head pushing rod 242 is secured. Further, the clamp body 1 is clamped and fixed by using only swing of the second clamping member 14, so that the second clamping member 14b can be closer to the first clamping member 11b during clamping and thus, allowing for clamping a tubular object having a smaller tube diameter.

The tightness adjusting assembly 2 is made up of the screwing member 21, the flattened section 22, the through-hole section 23, and the fastening member 24. The screwing member 21 is a bolt. The flattened section 22 is formed by forcibly pressing an end section of the screwing member 21. The through-hole section 23 is formed in the flattened section 22 to receive extension of the position-limiting axle 141. The fastening member 24 is an elongated T-shaped nut.

Figure 5:
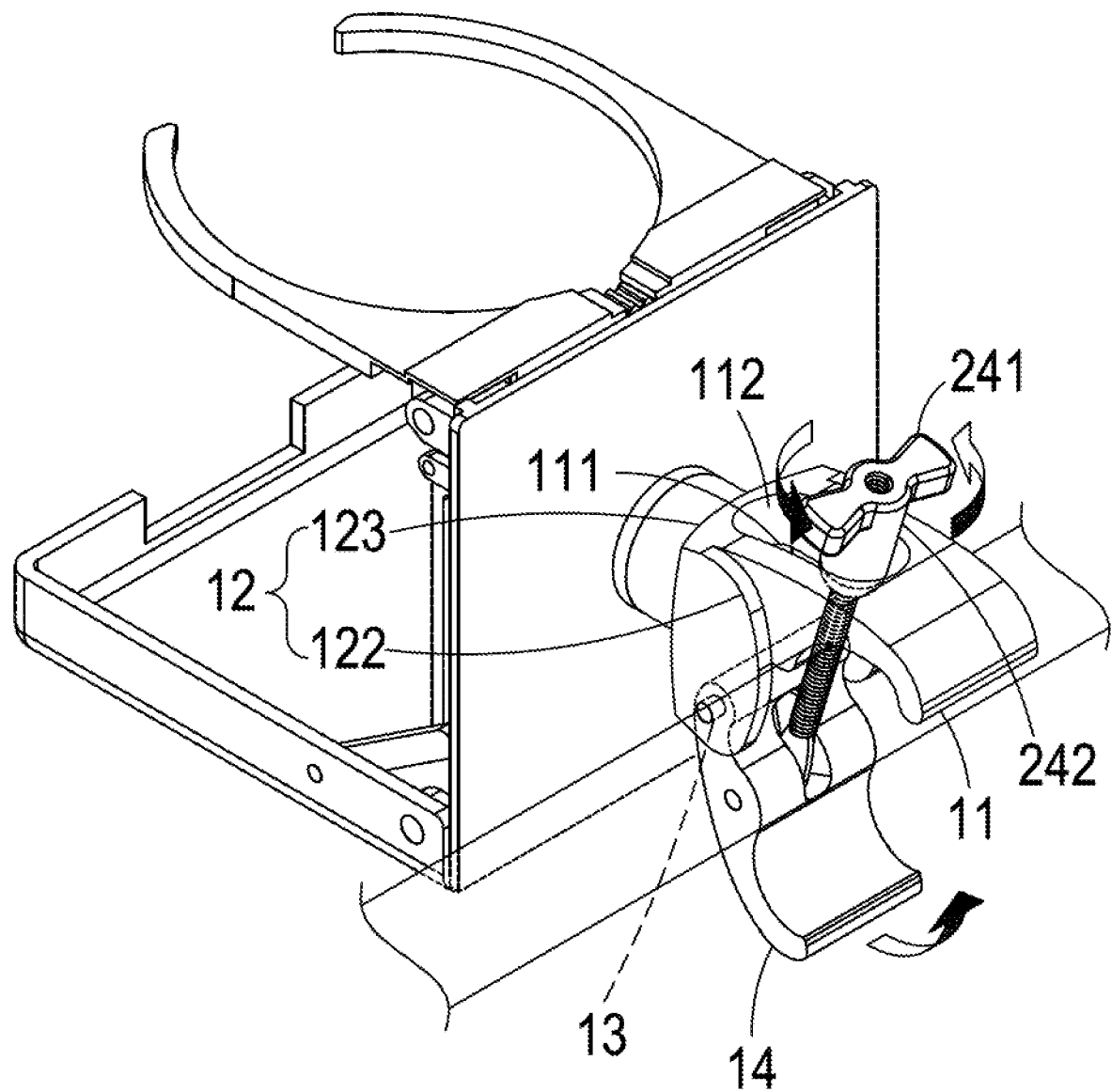
FIG. 5 is a schematic view demonstrating a clamping operation of the preferred embodiment of the present invention.
Figure 6:
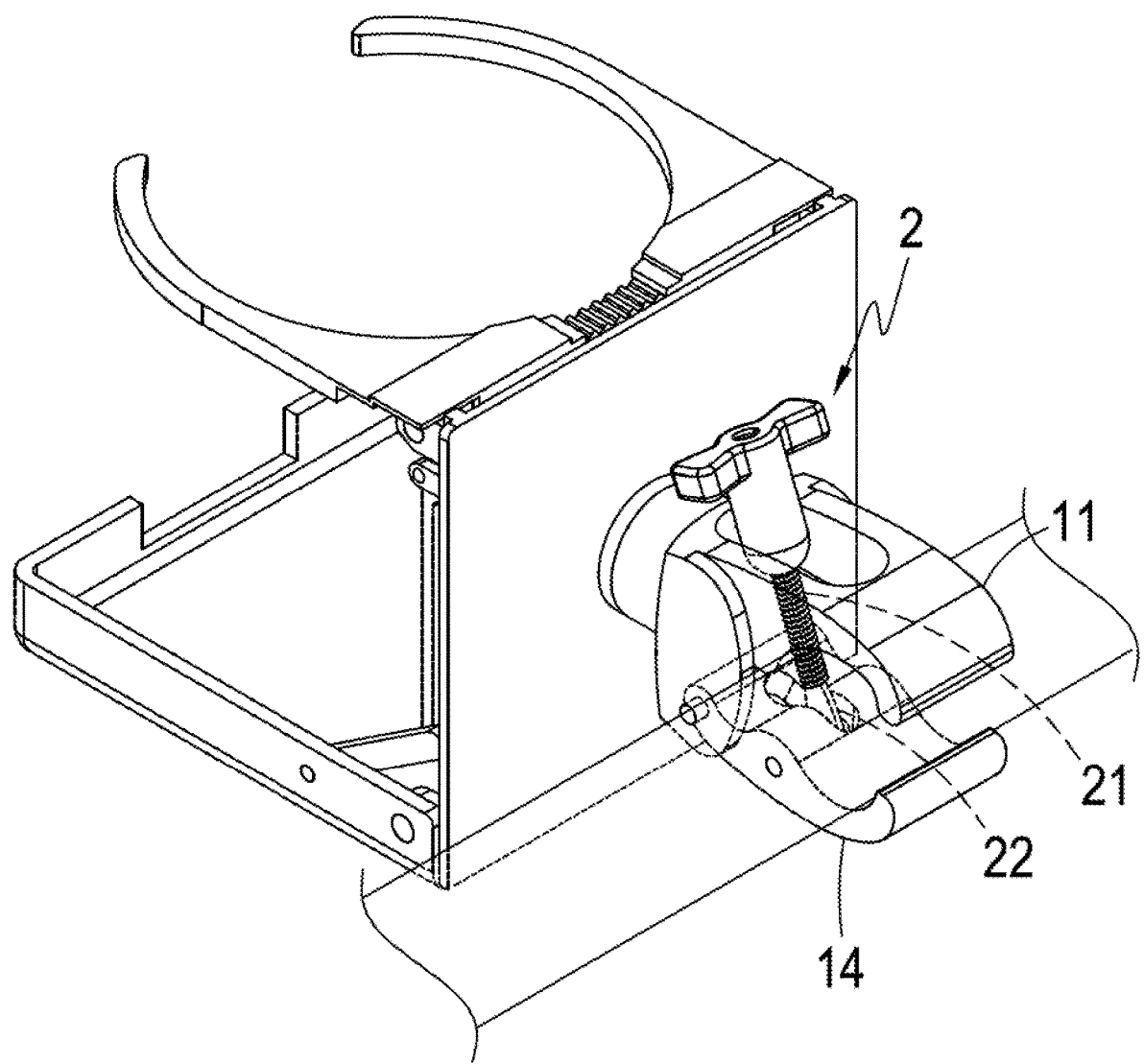
FIG. 6 is another schematic view demonstrating a clamping operation of the preferred embodiment of the present invention.
Figure 7:
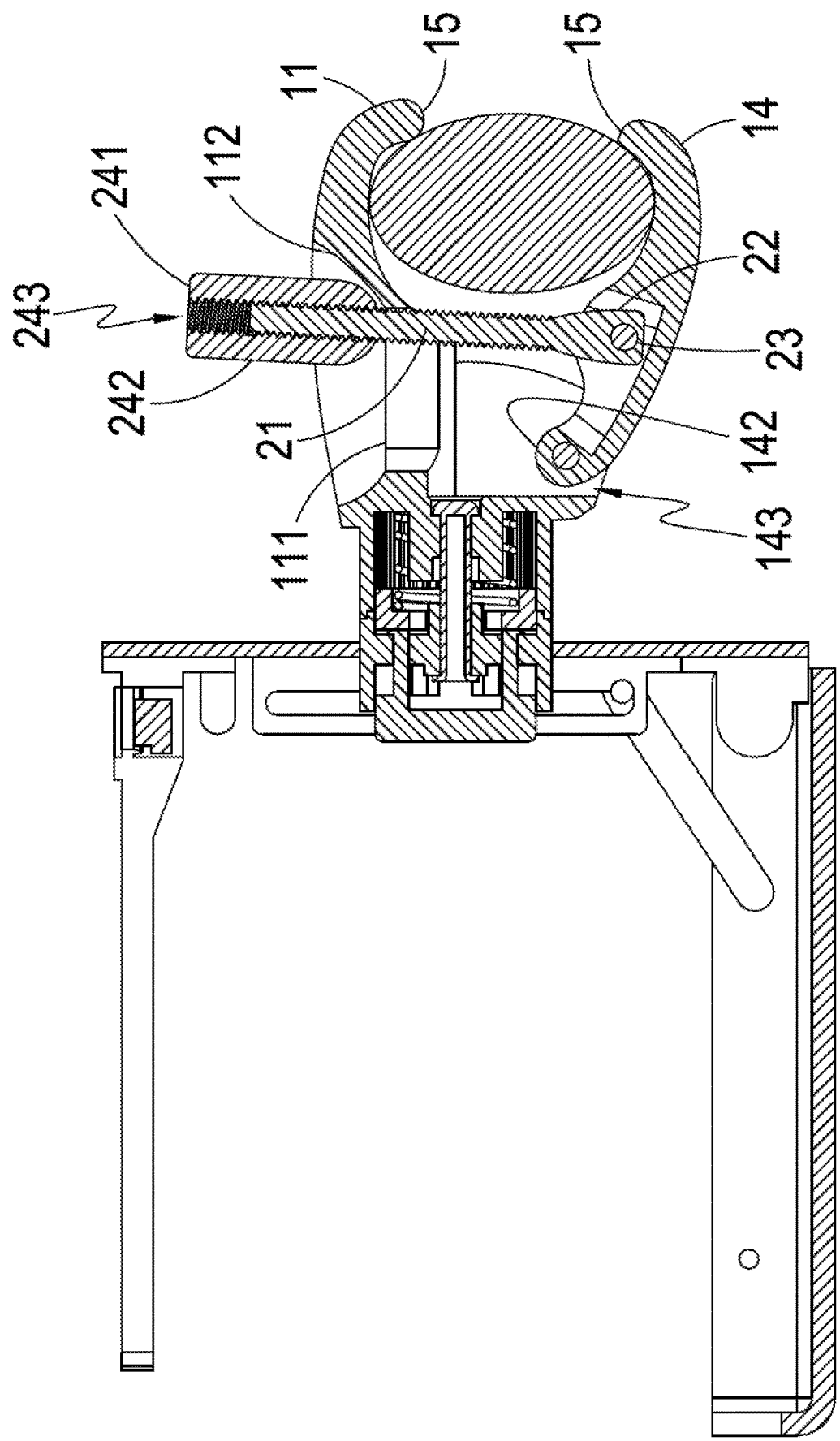
FIG. 7 is a further schematic view demonstrating a clamping operation of the preferred embodiment of the present invention.

As shown in FIGS. 5-7, in a clamping operation, the tightness adjusting assembly 2 is loosened first so that the second clamping member 14 is allowed to rotate about an axis defined by the pivot hole 13 to adjust an opening degree of the clamp body 1. Under this condition, since the screwing member 21 is pivotally connected to the position-limiting axle 141 by means of the through-hole section 23 formed in the flattened section 22 to allow the screwing member 21 swing or oscillate in the elongated through hole 111 of the first clamping member 11, adjusting fastening and screwing of the fastening member 24 with the gripping section 241 would allow for easy adjustment of tightness of fastening of the clamp body 1 and the clamping strength thereof, so that material selection and fabrication of the tightness adjusting assembly 2 are relatively easy. In addition, when the screwing member 21 causes the rounded-head pushing rod 242 to swing, the rounded-head pushing rod 242 is subjected to positional constraint or limiting by the circular arc wall 112 and is selectively in abutting engagement with at least two surfaces so as to help the screwing member 21 to provide the clamping force of the clamp body 1. During a fastening operation, since the elongated rounded-head pushing rod 242 is formed therein with a head-concealing hole 243 in which the screwing member 21 can be embedded and concealed, so that even fastening is made to the bottom, the screwing member 21 is set to have an end thereof substantially flush with a surface of the gripping section 241 to thereby ensure better safety. Further, although the rounded-head pushing rod 242 is of an elongated configuration, the elongated through hole 111 and the circular arc wall 112 that gradually shallows from a depth are arranged in a configuration of a recess structure formed in the first clamping member 11, so that the length requirement for the screwing member 21 and the fastening member 24 can be reduced, or the size of the tightness adjusting assembly projecting outward is reduced.

Further, the second clamping member 14 is formed with a circular arc section 142 at one side thereof that is close to the clamping seat 12 to provide a swing gap 143 between the circular arc section 142 and the clamping seat 12 so that a swing angle or oscillation angle of the second clamping member 14 is at least from −10 degrees to 90 degrees (taking a perpendicular included angle between the second clamping member 14 and the clamping seat 12 as a reference), and thus, when the pivot section 13 provided on the clamping and fixing sidewall 122 is set further away from the clamping and fixing bottom board 123, the swing gap 143 is made larger and the swing angle is also larger, allowing the clamp body 1 to clamp on a tubular object having a longer tube diameter, such as an elliptic tube. When clamping is made to an elliptic tube, by means of the arrangement of the hooking arc section 15, an effect of clamping for at least four point can be applied to the elliptic tube, so that this invention can be securely attached to generally commercially available products, such as bicycle, wheelchairs, rollators, baby trolleys, and sickbeds for either thin circular tubes or thick elliptic tubes.

Figure 8:
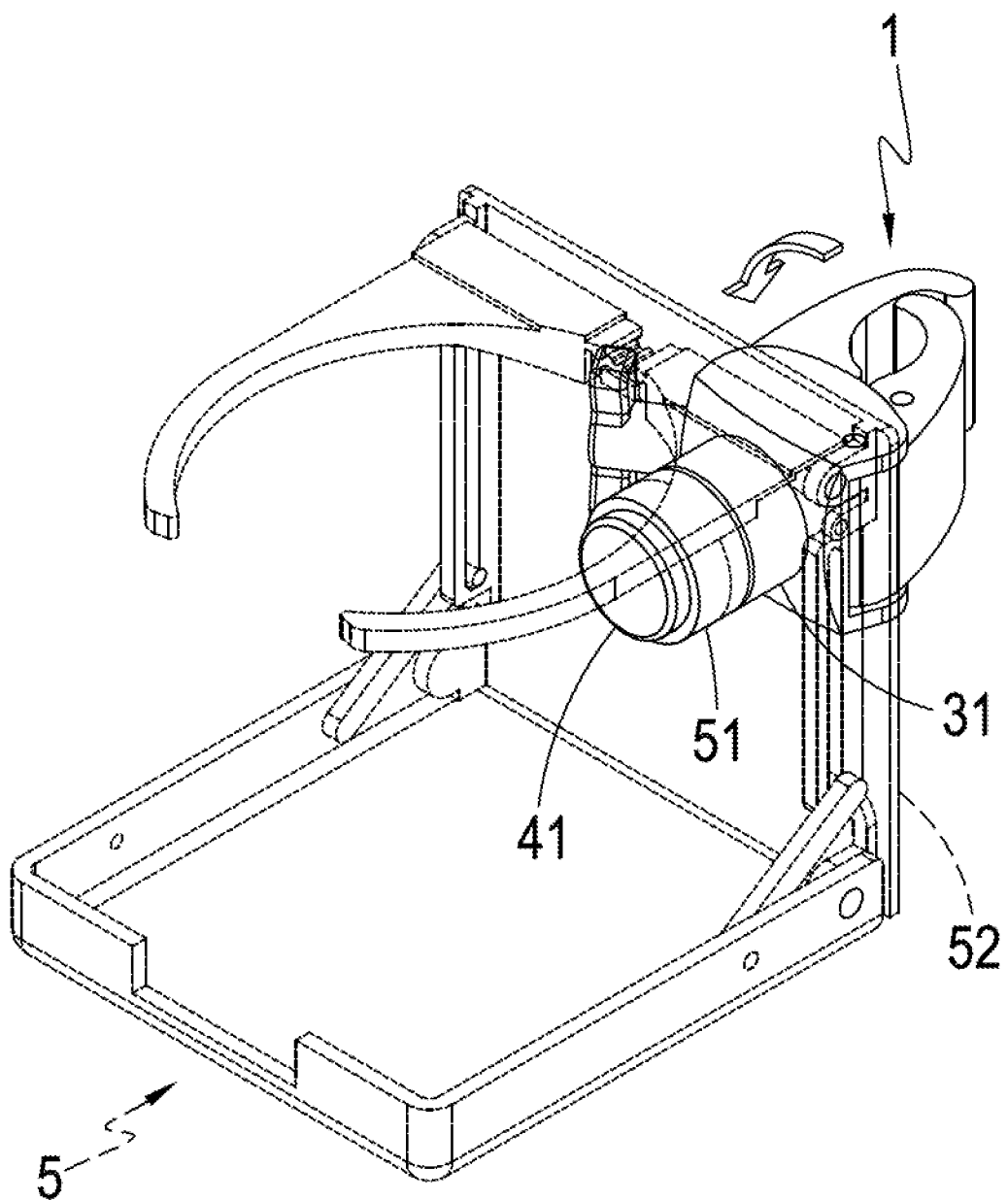
FIG. 8 is a schematic view demonstrating a rotation operation of the preferred embodiment of the present invention.
Figure 9:
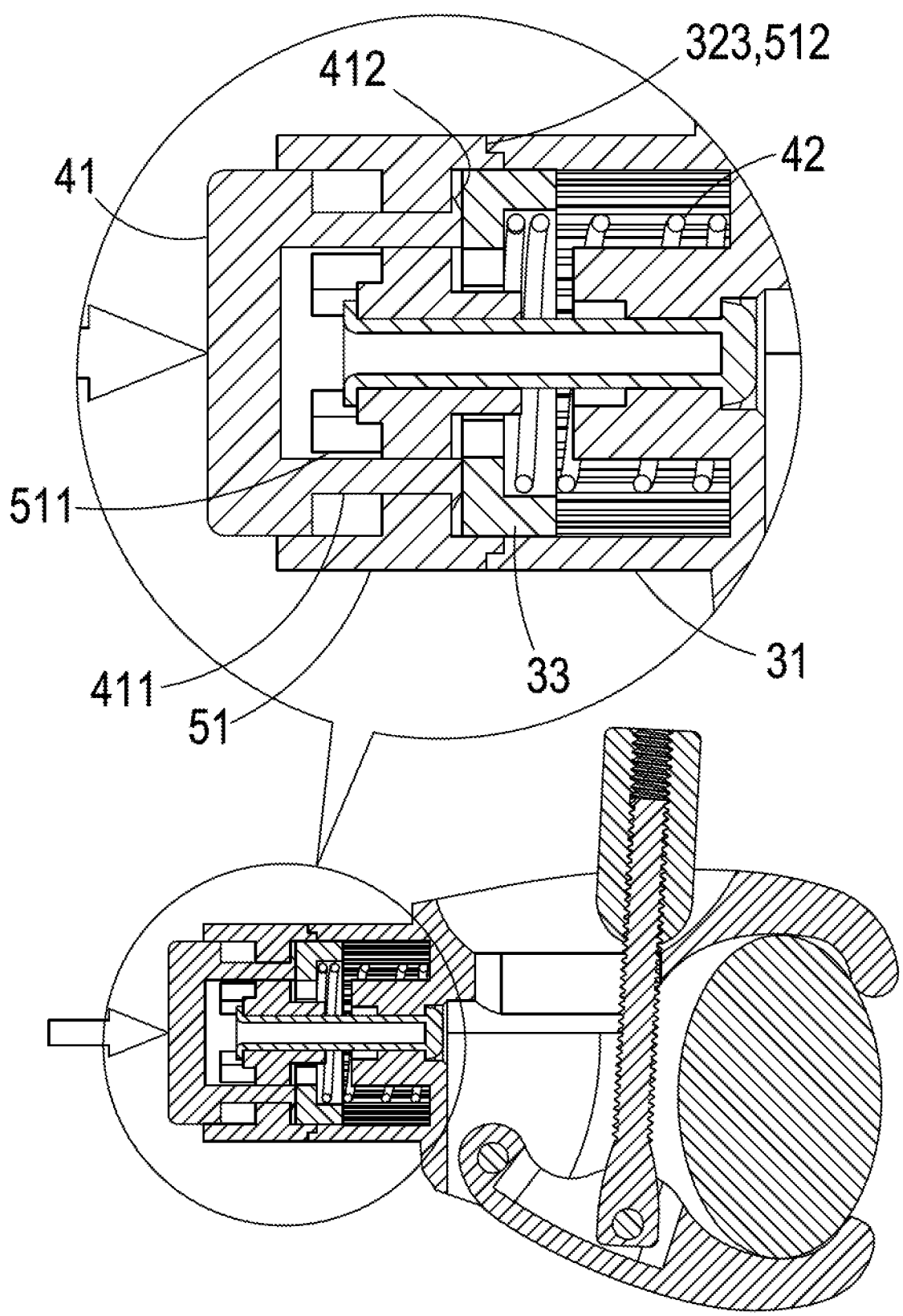
FIG. 9 is another schematic view demonstrating a rotation operation of the preferred embodiment of the present invention.
Figure 10:
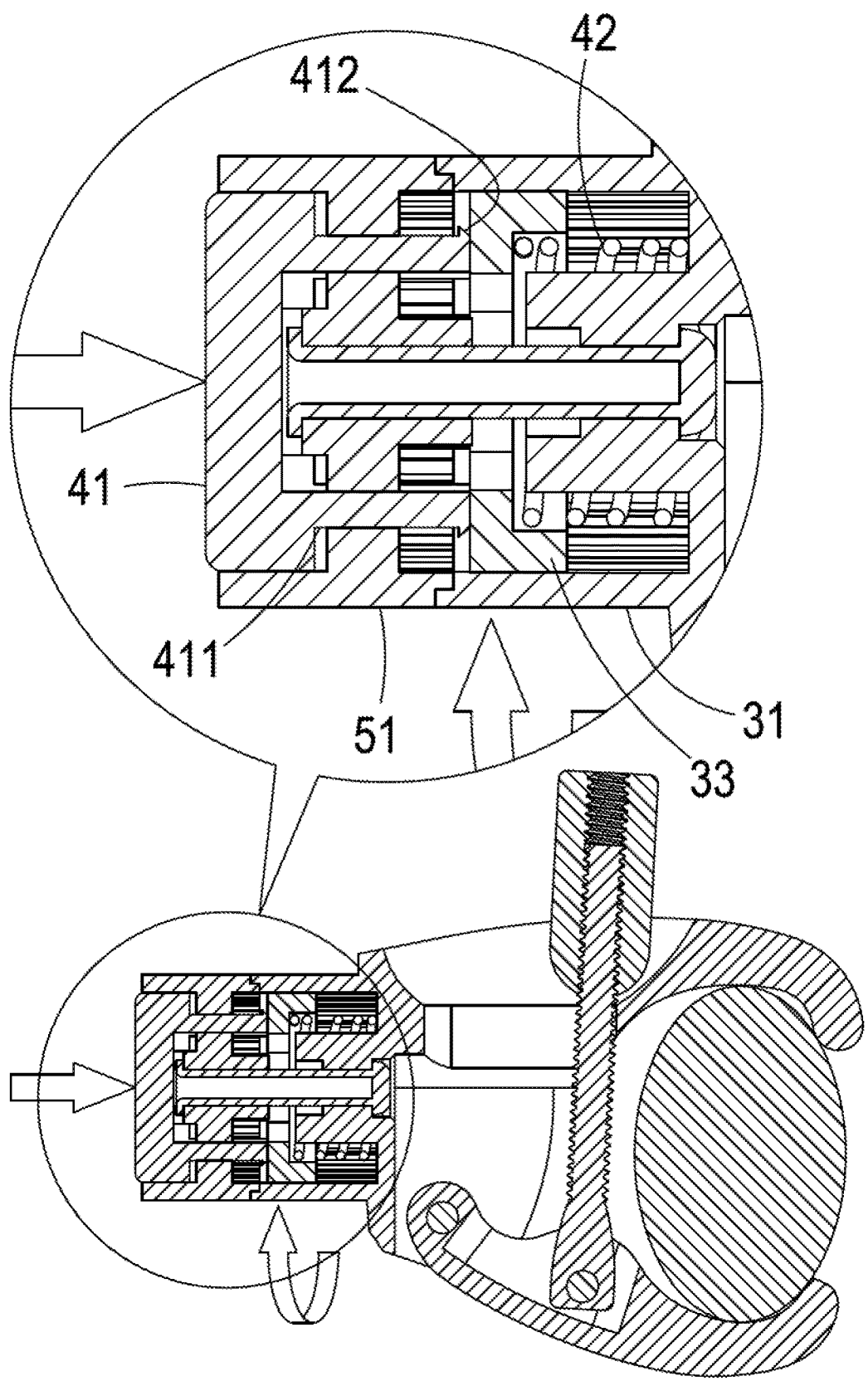
FIG. 10 is a further schematic view demonstrating a rotation operation of the preferred embodiment of the present invention.

As to the rotation assembly 3 of one side of the clamping seat 12, adjustment made by a user in respect of an angle of the holder 5 is enabled thereby. As shown in FIGS. 8-10, the rotation operation is achieved with the aligned arrangement of the engagement trough 32 of the rotation seat 31 and the engagement seat 51 of the holder 5 (wherein the engagement seat 51 extends through the fixing plate 52 of the holder 5 and is formed by integrally combined, at a suitable location, with the holder 5), so that movable arrangement of the engagement member 33 in the engagement trough 32 is used to provide operative coupling between the rotation seat 31 and the engagement seat 51 to thereby provide rotation of an angular range of 360 degrees. Further, the position-limiting pillar 321 in the engagement trough 32 allows for easy sleeving of the elastic member 42 thereon and also allows for use of the corresponding coupling between the position-limiting projection sections 322 of the position-limiting pillar 321 and the position-limiting recess sections 331 of the engagement member 33 to serve as a fixed sliding rail of the elastic member 42 and the engagement member 33, so that the elastic member 42 and the engagement member 33 do not get derailed due to being pressed by the pressing member 41 and sensitivity of rotation of the engagement seat 51 is not lowered or even get jammed (wherein in the instant embodiment, the position-limiting projection sections 322 being arranged in a cross configuration is taken as an example), to provide an effect of assisting rotation and preventing excessive wear of the engagement seat 51 and the engagement member 33. Further, coupling among the clamping seat 12, the rotation assembly 3, and the holder 5 is achieved by using a riveting member 34 extends from the first pin hole section 121 on one side of the clamping seat 12a to the rotation seat 3 and extending through the position-limiting pillar 321 of the engagement trough 32 to extend through the elastic member 42, the engagement member 33 and the second pin hole section 513 of the engagement seat 51, a riveting machine is used to expand an end of the riveting member 34 to fix the clamping seat 12 and the rotation seat 31 to the holder 5.

Particularly, the present invention can use the position-limiting mechanism 4 to secure the holder 5 at a selected direction, and the operation is extremely easy, so that for a user, it only needs to press down the pressing member 41 to carry out relative rotation between the rotation seat 31 and the holder 5. A corresponding operation of internal components is as follows. The pressing member 41, when pressed down, makes the engaging and fixing section 411 extending through the position-limiting hole 511 out of the engagement seat 51 to push the engagement member 33 and the elastic member 42, allowing the engagement member 33 to separate from the engagement seat 51 and temporarily stay in the engagement trough 32. Under such a condition, the holder 5 may cause the engagement seat 51 to rotate relative to the rotation seat 31, and during the rotation, at an upper edge of the engagement trough 32 and a lower edge of the engagement seat 51, position limiting by means of corresponding and coupling between the first joint section 323 and the second joint section 512 makes the engagement trough 32 of the rotation seat 31 and the engagement seat 51 more secured. When the user releases the pressing member 41, the engagement member 33 is acted by the spring force of the elastic member 42 to have the engagement member 33 pushed back in an opposite direction, allowing the engagement member 33 to re-engage between the engagement trough 32 and the engagement seat 51. The position returning of the engagement member 33 also pushes the pressing member 41 in an opposite direction so that the pressing member 41 ejects out again; however, the engaging and fixing section 411 is provided with the barbed section 412, and the barbed section 412 may hooks on a bottom of the engagement seat 51 to constrain the pressing member 41 on one side of the engagement seat 51.

Figure 11:
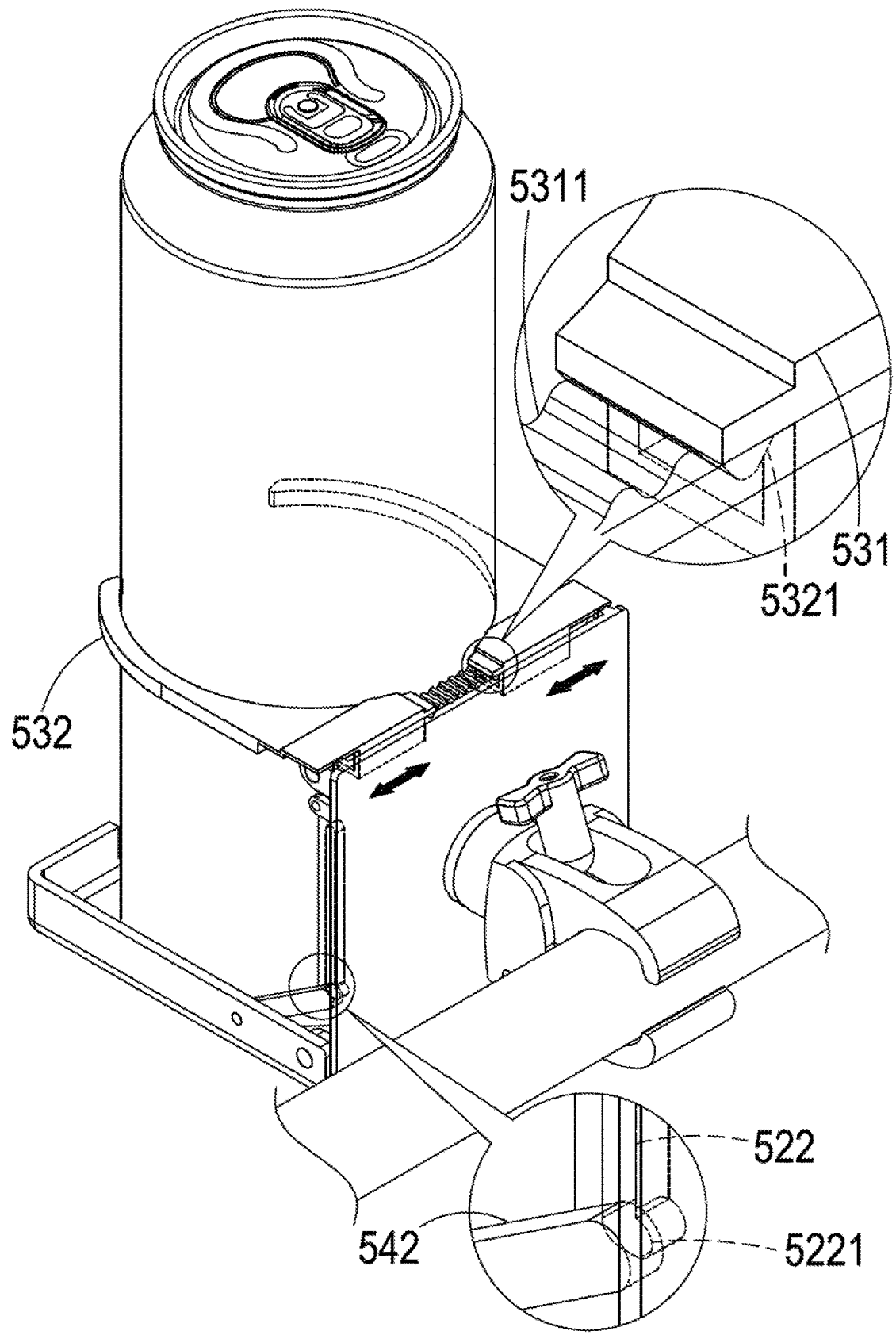
FIG. 11 is a schematic view demonstrating an adjustment operation of clamping arms of the preferred embodiment of the present invention.
Figure 12:
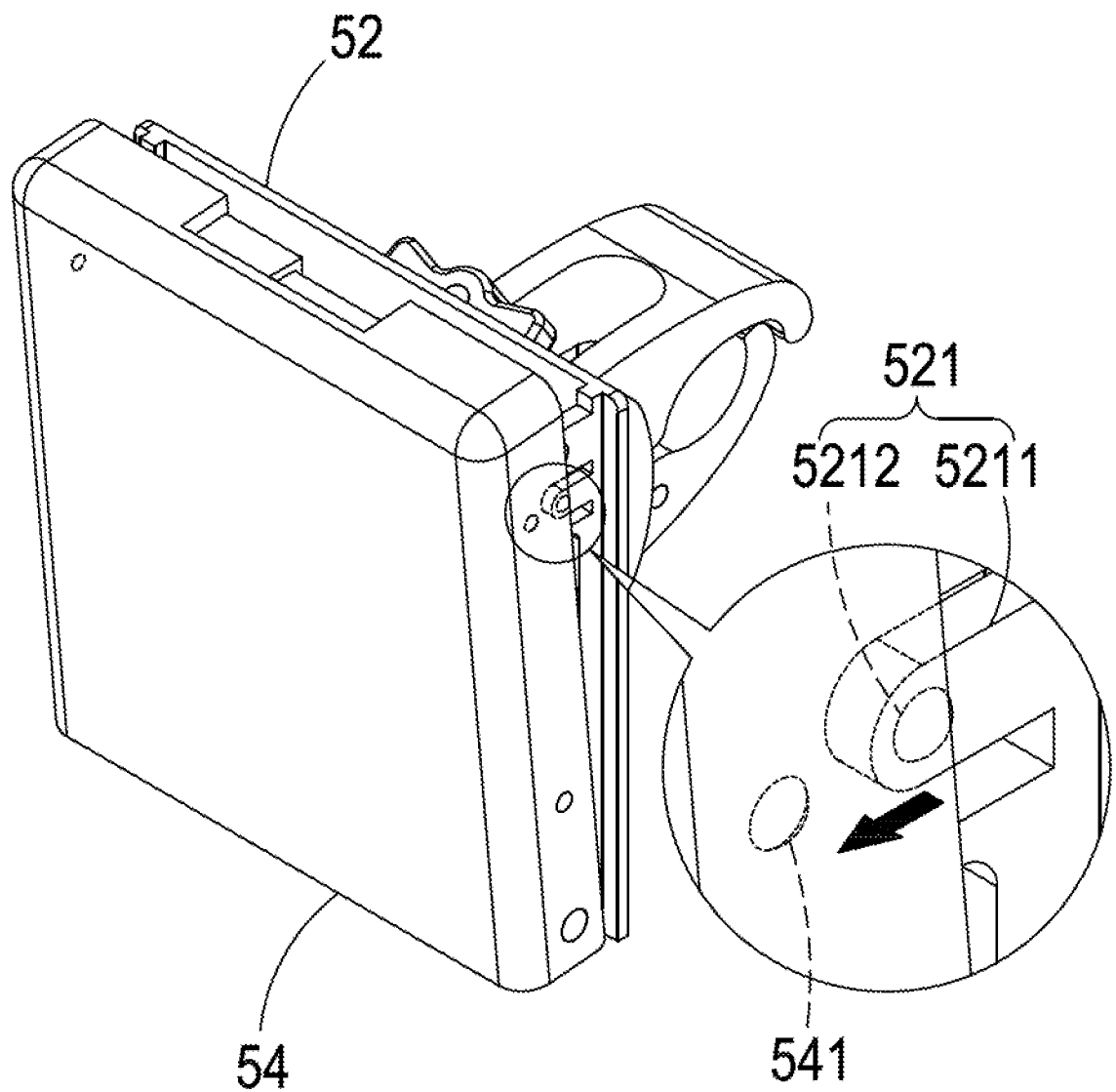
FIG. 12 is a schematic view demonstrating a stowing operation of the preferred embodiment of the present invention.

As shown in FIGS. 11-12, a user may adjust and move the two clamping arm sections 532 according to the size of an object (such as drink) to expand the clamping arm sections 532 on the bar section 531. Further, since the bar section 531 is provided with a plurality of successive positioning recess sections 5311, the clamping arm sections 532 use the positioning projection sections 5321 to selectively position in one of the positioning recess sections 5311 so as to prevent the clamping arm sections 532 from being forced to move by an excessive weight of an object placed thereon and thus provide a more stable effect of securing. When the user has no need to use the holder 5, the bottom board section 54 can be folded and stowed at one side of the fixing plate 52 to save space, and in stowing, the two buckling members 521 of the fixing plate 52 and the two bottom board buckling sections 541 of the bottom board section 54 are used for stowing and fixing. When the bottom board section 54 is positioned against the fixing plate 52, the bottom board buckling sections 541 are correspondingly buckled to the fixing buckling sections 5212 of the board body 5211 to prevent the bottom board section 54 from detaching from the fixing plate 52 caused by vibration and similar causes. Oppositely, to use the holder 5, besides releasing the fixing operation between the buckling member 521 and the bottom board buckling section 541, the linking bar 542 can be used to provide an effect of supporting, lowering the likelihood of the bottom board section 54 swinging upward due to impact to thereby preventing the potential risk of an object placed on the bottom board section 54 getting falling down therefrom. Specifically, when the bottom board section 54 is rotated and flipped, the linking bar 542 is sliding in the sliding channel 522 and when the bottom board section 54 is opened to a desired position, one end of the linking bar 542 is trapped in the position-limiting slot 5221 so as to limit further sliding of the linking bar 542 thereby achieving an operation of constraining the position of the bottom board.

Figure 13:
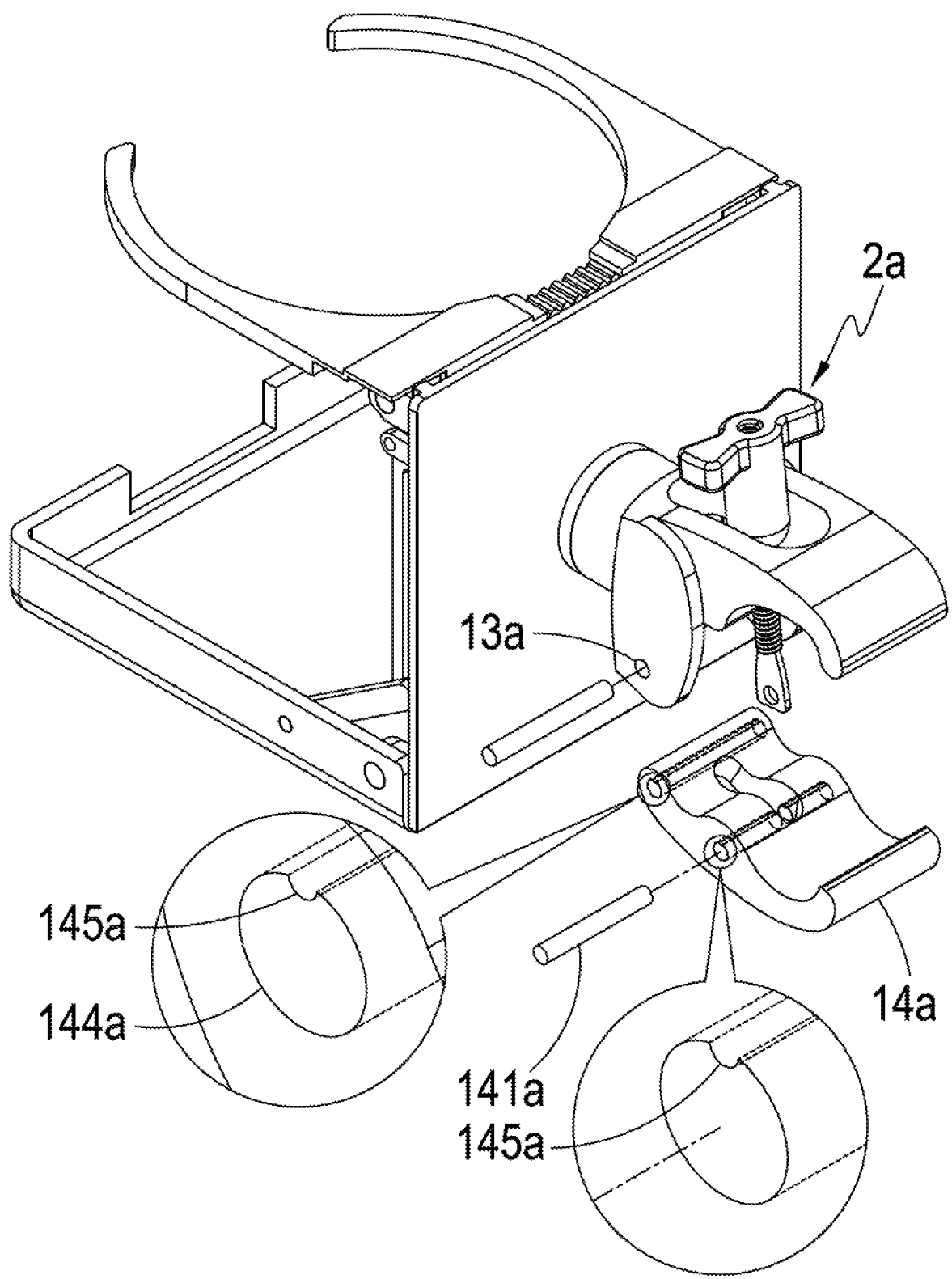
FIG. 13 is an exploded view showing a clamping body of another preferred embodiment of the present invention.

As shown in FIG. 13, in the instant embodiment, the second clamping member 14a is provided with at least one engaging and stopping projection section 145a in an opening 144a corresponding to the pivot hole 13a and the position-limiting axle 141a so that at the coupling between the second clamping member 14a and the clamping seat 12a and the coupling between the second clamping member 14a and the tightness adjusting assembly 2a, the engaging and stopping projection section 145a that is provided in the opening 144a in the form of a projecting rib or a projecting spot makes the coupling with an axle (such as the position-limiting axle 141a) tighter, preventing the second clamping member 14a from causing detaching of the axle (such as the position-limiting axle 141a) due to rotation or oscillation thereof, thereby improving stability of the clamping force.

Figure 14:
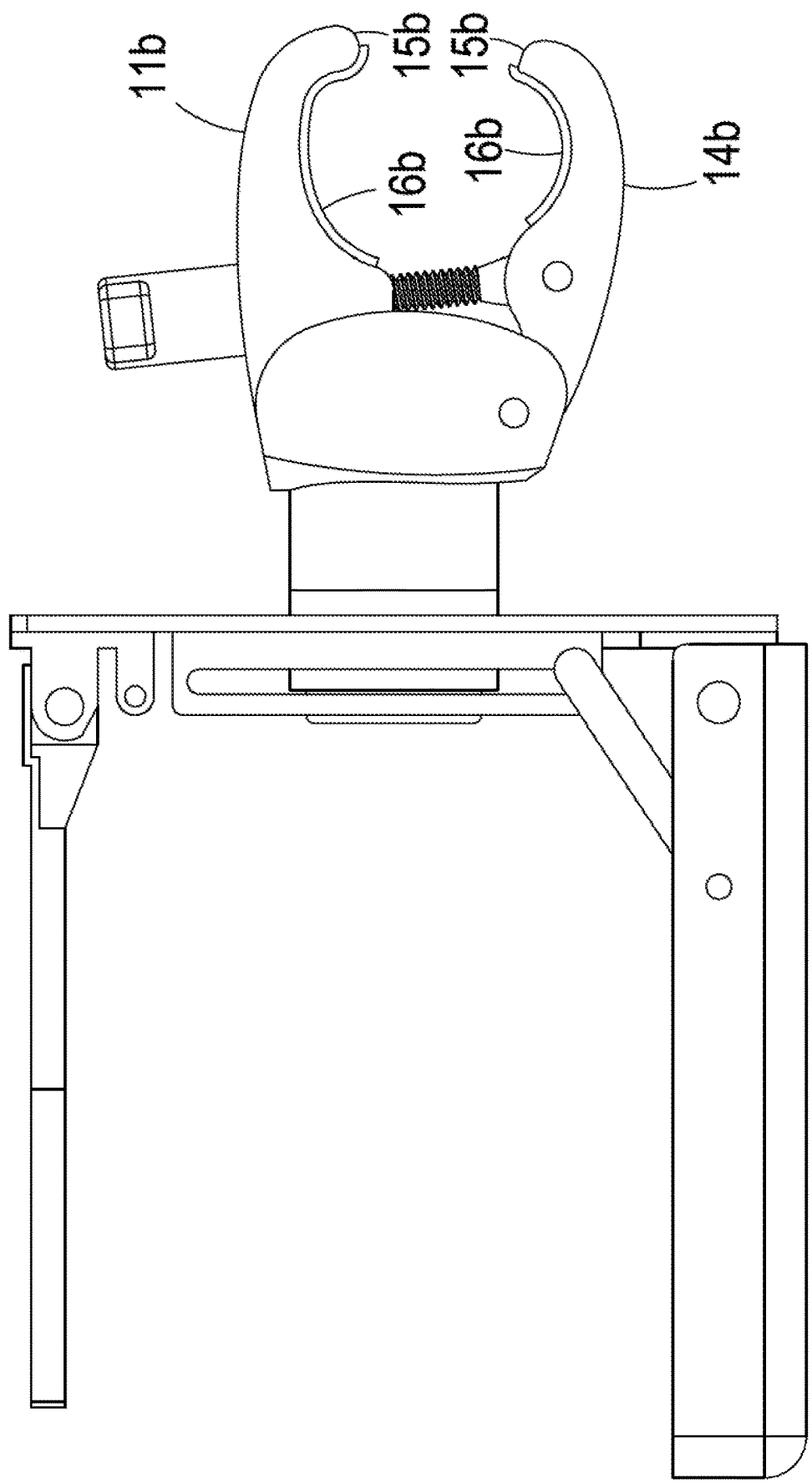
FIG. 14 is a schematic view showing a condition of use of a further preferred embodiment of the present invention.
Figure 15:
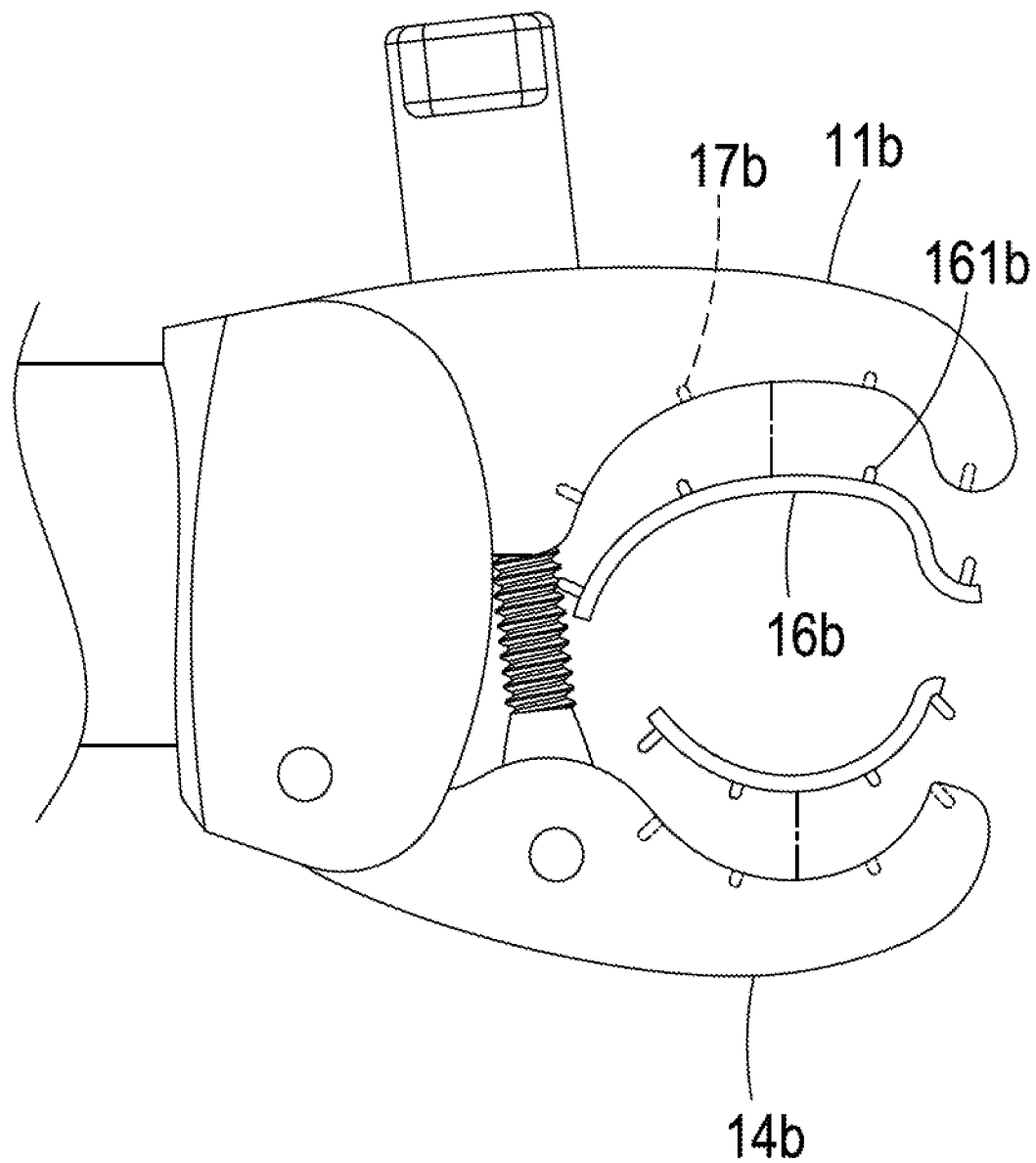
FIG. 15 is an exploded view showing an anti-skidding pad of a further embodiment of the present invention.

As shown in FIGS. 14-15, in the instant embodiment, the first clamping member 11b and the second clamping member 14b are each provided, on an end thereof, with a hooking arc section 15b, and the first clamping member 11b and the second clamping member 14b are provided with at least one anti-skidding pad 16b. The anti-skidding pad 16b is extended to the site where the hooking arc section 15b is formed. The first clamping member 11b and the second clamping member 14b are formed with at least one engagement slot section 17b, and the anti-skidding pad 16b is provided, on one side thereof, with at least one engagement section 161b corresponding to and engageable with the engagement slot section 17b, so that the anti-skidding pad 16b uses the engagement between the engagement section 161b and the engagement slot section 17b to increase the coupling strength between the anti-skidding pad 16b and the first clamping member 11b or the second clamping member 14b. The anti-skidding pad 16b is arranged to extend to the site of the hooking arc section 15b, so that it is effective to increase overall clamping force by using the anti-skidding pad 16b, even though a user intends to clamp onto a tubular object having a large tube diameter.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A drink holder mounting structure for attaching to various tubular objects, mainly comprising:

a clamp body, wherein the clamp body comprises a first clamping member, a clamping seat integrally formed with the first clamping member, at least one pivot hole formed in one side of the clamping seat that is away from the first clamping member, a second clamping member pivotally connected to the pivot hole, and a plurality of hooking arc sections respectively formed at ends of the first clamping member and the second clamping member;

a first pin hole section formed in the clamping seat;

a circular arc section formed on the second clamping member and located at one side of the pivot hole, the circular arc section defining a swing gap with respect to the clamping seat;

an elongated through hole formed in the first clamping member;

at least one circular arc wall defined on the first clamping member and formed as being extended from an outer edge of the elongated through hole in a manner of gradually shallowing from a depth;

a position-limiting axle arranged between inside wall surfaces of the second clamping member;

a tightness adjusting assembly movably arranged at one side of the first clamping member for adjusting tightness between the first clamping member and the second clamping member, the tightness adjusting assembly comprising a screwing member received through the elongated through hole, a flattened section formed on the screwing member, a through-hole section formed in the flattened section for receiving extension of the position-limiting axle therethrough, and a fastening member screwed to the screwing member for fastening and tightening the first clamping member, the fastening member comprising a gripping section, a rounded-head pushing rod formed at one side of the gripping section, and a head-concealing hole in communication with the gripping section and the rounded-head pushing rod for receiving the screwing member to embed therein;

a rotation assembly for coupling the clamp body and a holder, the rotation assembly comprising a rotation seat corresponding to and coupled to the clamping seat, an engagement trough formed in the rotation seat, at least one first joint section defined on an upper edge of the engagement trough, an engagement member movably arranged in the engagement trough, an engagement seat integrally formed with the holder and driven through operative coupling of the engagement member and the rotation seat to rotate, and a riveting member for riveting the clamping seat, the rotation seat and the engagement seat, the engagement trough being formed therein with a position-limiting pillar in communication with the first pin hole section, the position-limiting pillar having a side wall formed with at least one position-limiting projection section, the engagement member being formed thereon with a position-limiting recess section corresponding to and coupled to the position-limiting pillar and the position-limiting projection section, the engagement seat being formed with at least one position-limiting hole, the engagement seat being formed, in a center thereof, with a second pin hole section in communication with a center of the position-limiting pillar and the first pin hole section;

at least one second joint section defied in a lower edge of the engagement seat and corresponding to and coupled to the first joint section; and a position-limiting mechanism arranged at one side of the engagement seat for selectively changing the direction of the holder through the rotation assembly, the position-limiting mechanism comprising a pressing member selectively projecting beyond the holder to selectively push the engagement member, and an elastic member sleeved over the position-limiting pillar for reciprocal movement of the engagement member, the pressing member comprising at least one engaging and fixing section extending through the position-limiting hole and a barbed section formed on the engaging and fixing section to engage and abut the engagement seat.

2. The drink holder mounting structure for attaching to various tubular objects according to claim 1, wherein the first clamping member and the second clamping member are provided with at least one anti-skidding pad, the anti-skidding pad being extended to the hooking arc section, the first clamping member and the second clamping member being formed with at least one engagement slot section, the anti-skidding pad being provided, on one side thereof, with at least one engagement section corresponding to and engageable with the engagement slot section.

3. The drink holder mounting structure for attaching to various tubular objects according to claim 1, wherein the second clamping member is provided with at least one engaging and stopping projection section at the pivot hole and the position-limiting axle.

4. The drink holder mounting structure for attaching to various tubular objects according to claim 1, wherein the holder comprises a fixing plate integrally formed with the engagement seat and a clamping arm assembly pivoted to an upper part of the fixing plate, the clamping arm assembly comprising a bar section fixed to the upper part of the fixing plate, a plurality of clamping arm sections slidably coupled to the bar section, a plurality of positioning recess sections formed on the bar section, and a positioning projection section formed on each of the clamping arm sections and corresponding to and limiting position of the positioning recess section.

5. The drink holder mounting structure for attaching to various tubular objects according to claim 1, wherein the holder comprises a fixing plate integrally formed with the engagement seat, a bottom board section pivoted to a lower part of the fixing plate, and at least one bottom board buckling section formed in the bottom board section, the fixing plate being formed with at least one buckling member, the buckling member comprising a board body connected to the fixing plate and a fixing buckling section formed on the board body and corresponding to and coupled to the bottom board buckling section.

6. The drink holder mounting structure for attaching to various tubular objects according to claim 5, wherein the fixing plate is formed with at least one sliding channel, the bottom board section being pivotally connected with at least one linking bar slidable in the sliding channel, the sliding channel being formed with a position-limiting slot for positional constraint of the linking bar.

\* \* \* \* \*